United States Patent Office 3,385,663
Patented May 28, 1968

3,385,663
PREPARATION OF HIGH SURFACE AREA, WATER-DISPERSIBLE ALUMINA MONOHYDRATE FROM LOW SURFACE AREA ALUMINA TRIHYDRATE
David A. Hughes, Charleston, W. Va., assignor to E. I. du Pont de Nemours and Company, Wilmington, Del., a corporation of Delaware
No Drawing. Filed July 31, 1964, Ser. No. 386,743
4 Claims. (Cl. 23—143)

ABSTRACT OF THE DISCLOSURE

Alumina trihydrate having a surface area of 5 to 50 square meters per gram is converted to alumina monohydrate having a surface area of more than 200 square meters per gram by autoclaving the alumina trihydrate at a temperature of 150 to 250° C. in the presence of water, a weak acid such as acetic acid, a water-soluble salt such as ammonium sulfate and optionally in the presence of trace amounts of a mineral acid such as hydrochloric acid. The product when dried is redispersible in water and a very useful form of alumina.

---

This invention relates to a process for the preparation of a high surface area, water-dispersible alumina. More particularly, this invention relates to the discovery that gibbsite alumina trihydrate with a surface area of about 5 to about 50 square meters per gram can be converted to a water-dispersible alumina monohydrate having a surface area of over 200 square meters per gram by autoclaving the trihydrate in the presence of a weak acid, water, and a water soluble salt composed of a univalent cation and a polyvalent acid anion.

The art has long sought a process which would allow the use of weak acids to convert alumina trihydrate to a water-dispersible alumina monohydrate having a high surface area. There is a natural preference for the use of weak acids in preparing an alumina as such acids are generally less corrosive, more volatile, and more easily distilled, recovered, and recycled, than are strong acids. Moreover, trace amounts of acid remaining on the product pose fewer problems when the acid is a weak acid. There is also a natural preference for the use of alumina trihydrate as a starting material as it is quite inexpensive and abundantly available. However, the use of weak acids in the preparation of alumina monohydrate from alumina trihydrate in the past has consistently resulted in alumina monohydrate with surface areas of less than 150 square meters per gram.

I have discovered a simple one-step process whereby a weak acid, such as acetic acid, is used in conjunction with water and a water-soluble salt of a univalent base and a polyvalent acid to convert a low surface area gibbsite alumina trihydrate to a water-dispersible alumina monohydrate having a surface area greater than 200 square meters per gram by heating the mixture of autogenous pressure for from 10 seconds to 10 hours at a temperature of from 150 to 250° C.

STARTING MATERIALS

Alumina trihydrate

The gibbsite alumina trihydrate suitable for use in this invention is one having a surface area of from about 5 to about 50 square meters per gram which corresponds to a crystallite size of about 30 to 300 millimicrons. Such a material may be obtained commercially, for example, as "Hydral 705," "Hydral 710," or C–331 grade hydrated alumina, from the Aluminum Company of America. Optionally, the material can be prepared by autoprecipitation of an alkali metal aluminate as disclosed in Wall, U.S. Patent No. 2,549,549, issued Apr. 17, 1951.

The alumina trihydrate sold commercially as "Hydral 710" has a surface area of from 6 to 8 square meters per gram, that sold as "Hydral 705" has a crystalline size of 62 to 99 millimicrons and a surface area of from 16 to 24 square meters per gram, and that sold as C–331 grade hydrated alumina has a surface area of about 5 square meters per gram.

A more preferred starting material for this invention is a gibbsite with a surface area in the range of 15 to 40 square meters per gram. When such a starting material is used it is also preferred to start the process not with dried gibbsite material but with the undried wet cake intermediate from the trihydrate preparation. Starting with the undried gibbsite avoids the inconvenience of having a starting material in which the alumina trihydrate crystals are bound together or agglomerated due to the drying process.

The amount of gibbsite alumina trihydrate calculated as $Al_2O_3$ which can be used in the process of this invention will range from about 1 to about 15% based on the weight of the reaction mass. That is to say, that from about 1 to about 15 grams of alumina trihydrate calculated as $Al_2O_3$ may be used per 100 grams of reaction mass total. For reaction convenience between 5% and 12% by weight of gibbsite calculated as $Al_2O_3$ is preferred.

Acids

Weak acids suitable for use in this invention are those with a dissociation constant at 25° C. of from $1\times10^{-5}$ to $2\times10^{-4}$. Representative of such acids are formic, acetic, acrylic, propionic, and butyric. Acetic acid has been found to be particularly suitable.

The amount of weak acid used will be sufficient to furnish an alumina to acid mole ratio of from 1:1 to 10:1. However, the correlation of amounts of alumina trihydrate to amounts of acid used is such that if low percentages of alumina starting material are present in the reaction mass, higher ratios of acetic acid to alumina are preferred. This preference stems from a desire for the presence during the reaction of sufficient acid to allow reasonable reaction times. A preferred alumina to acid ratio is from 1:1 to 6:1 which insures the presence of the aforementioned desired amount of acid when the concentration of alumina trihydrate is in the lower permissible range such as about 1 to 5% of the reaction mass.

I have also discovered that the use of trace amounts of a monobasic mineral acid such as nitric acid or hydrochloric acid along with the weak acid such as acetic, imparts extremely beneficial results. For example, from 100 to 2000 p.p.m. of nitric acid, based on the weight of the reaction mass, may be added initially to the reaction mass. This probably effects a hastening of the depolymerization of the gibbsite alumina trihydrate. Such an effect would hasten and accelerate the conversion of the alumina trihydrate to the alumina monohydrate. As a result, a small amount of such acid removes the need for a much larger amount of weak acid. For every gram of an acid such as nitric acid used, there is a corresponding decrease in the amount needed of weak acid such as acetic by about 9 to 12 grams. However, use of more than about 2000 p.p.m. of the strong acid tends to leave too much residual nitric acid on the product, and tends to form too much soluble aluminum nitrate which is difficult to remove from the product and causes an undesirable decrease in the yield of alumina monohydrate.

Water-soluble salts

The water-soluble salts suitable for use in this invention are those which dissolve in the aqueous reaction medium of the invention and are derived from univalent basic materials and polyvalent acidic substances. The anions of such salts add greatly to the redispersibility of the alumina monohydrate product of this inventon.

Inorgnic cations derived from salts of the metals of Group I–A of the Periodic Table of Elements and organic cations derived from substances like amines and ammonium, ethyl ammonium, trimethyl ammonium, and tetramethyl ammonium are all suitable. However, for reasons of economy and convenience, the univalent cations of the alkali metals, ammonia, or the lower alkylamines are preferred and the cations of lithium, sodium, potassium and ammonium are especially preferred, since these cations provide the widest freedom of choice as to water-soluble, readily available salts with the preferred class of anions.

In choosing salts which are suitable for use in this process, the selection of the anion portion is quite critical. It has been found that, in general, acidic materials which have only a single valence such as $HNO_3$, HCl, and $HClO_4$ do not provide effective anions when they are added as alkali metal or ammonium salts. To be effective, the salt must be able to ionize into a polyvalent anion like that of sulfuric acid, $SO_4^=$.

Examples of inorganic polyvalent anions include sulfate, phosphate, phosphite, chromate, dichromate, vanadate, arsenate, borate, ferrocyanide, ferricyanide, and the like.

Examples of organic polyvalent anions include those of dicarboxylic acids and the like, such as oxalate, maleate, succinate, glutarate and adipate; those of tricarboxylic acids such as 2-hydroxy-1,2,3-propanetricarboxylic acid and citrate; those of tetracarboxylic acids; and those polyfunctional carboxylic acids such as tartrate, fumarate, acetone-dicarboxylate, and the like. Organic polyvalent anions having molecular weights below about 600 appear to work most satisfactorily in this invention.

It has been found that the normal and acid salts of sulfuric acid, oxalic acid, citric acid, fumaric acid and phosphoric acid are especially suitable for the process. Of these, ammonium sulfate and sodium sulfate are most preferred.

The amount of water-soluble salt used can vary from $0.2/v$ to $30/v$ moles per 100 moles of alumina trihydrate used, and the salt will preferably be present in amounts ranging from $0.6/v$ to $15/v$ moles per 100 moles of alumina trihydrate, where $v$ is the valence of the anion.

Water

The water used as a starting material for the processes of this invention need not be especially pure. It has been found that ordinary tap water, distilled water, and water demineralized with ion-exchange resins are all satisfactory.

Of course, in areas where the water supply contains high levels of sulfate or other of the polyvalent anions discussed above, they must be compensated for in calculating the amount of water-soluble salt which is added later in the process.

PROCESS CONDITIONS

The alumina trihydrate, weak acid, water-soluble salt, water, and mineral acid if used, are mixed together in the prescribed proportions in any order.

The mixture of alumina trihydrate, acid, salt, and water is heated under autogenous pressure at a temperature of more than about 150° C. for a time ranging from about 10 seconds to about 10 hours. A practical upper limit on temperature with existing process equipment and means of heating is about 250° C. As will be appreciated by those skilled in the art, the higher temperatures accelerate the reaction so that shorter times can be used. Thus, when operating in a batch process, it is desirable to operate with a 7–9 hour hold-time at 155° C., but equally good results construed on the basis of dispersibility and surface area of the end product, can be achieved at 180° C. in 1 to 2 hours. Indeed, it has been found that the time can be reduced by a factor of about 2 for a 10° C. rise in autoclaving temperature, or about double for a 10° C. decrease in temperature and equivalent results, based on equivalent dispersibility and surface area will be obtained.

At temperatures above 200° the reaction time is very difficult to measure accurately and allowance must be made for reaction occurring during heat-up and cooling.

When the hydrolysis is run in a continuous manner, as, for example, in a pipeline, it is preferably carried at a temperature of from about 180° C. to about 240° C., with a holding time of about 10 seconds to about 4 hours.

It is during the holding step that most of the conversion of the alumina trihydrate to alumina monohydrate occurs.

Although it is preferred to raise the operating temperature as rapidly as possible, under some conditions the heat-up time can be as much as 45% of the holding time without loss of dispersibility.

When conducting the process in a batch-wise manner, it is preferable that the heat-up time be about 6% of the total holding time. When a continuous process is used, the heat-up time is preferably 3% or less of the total holding time.

After the reaction, the resulting mixture is cooled below about 100° C. Cooling can be accomplished by any conventional means, as for example, by circulating water through the autoclave jacket. It is preferred to cool in the least possible time. Cooling below 50° C. is preferred when the product is to be drum dried.

After cooling, the reaction mixture is dried. The reaction mixture can be aged for from 1 to 10 days before drying if desired. Aging the mixture before drying tends to improve the stability of the product with respect to redispersibility when it is prepared at low temperatures or in low concentrations.

In general, the product of this invention can be dried by any conventional means. Thus, such conventional means, as spray, tray, drum, freeze, and other drying techniques, can be used.

The product film temperatures on the drum dryer should not be in excess of about 140° C., and preferably not in excess of about 125° C. Drying times are, in general, determined by the particular drying method employed. Normally, drying can be accomplished in conventional batch or continuous ways familiar to the art. However, since dispersibility is enhanced by minimum drying temperature and drying time, it is preferred to use a spray drying procedure.

Since it is preferred that short drying times be employed, if rotary drum dryers are used, the alumina monohydrate slurry is fed into the nip at such a rate that there is essentially no hold-up.

In a preferred embodiment, the process is a continuous one, with the raw ingredients being fed into one end of an apparatus train and the final product emerging from the other end. The apparatus can be conventional. A train consisting of a mixing tank, a pipeline reactor having suitable controls to regulate temperature and pressure, a cooling section, the proper pumps, and a drum dryer or spray dryer has been found to be satisfactory.

PRODUCTS

Products of this process are dry, white free-flowing powders of alumina monohydrate which are useful for the same purposes as those described in Bugosh U.S. Patent 2,915,475. The ultimate particles are largely in the colloidal range with a surface area ranging between about 200 and about 450 square meters per gram.

Surface areas or crystallite size of the products or the starting materials can be determined by any conventional means. A suitable method for such determinations is the nitrogen flow method as outlined in "An Efficient Dynamic Method for Surface Area Determination" by H. W. Daeschner and F. H. Stross in Analytical Chemistry, vol. 34, p. 1150, 1962. A suitable standard for such a determination is Houdry alumina catalyst with a surface area of 193±1 meters per gram.

Alternatively, the products or the starting materials can be measured by X-ray diffraction patterns, or electron microscope.

The breadth of a diffraction line is readily determined by procedures described in detail in such standard texts as "X-Ray Diffraction Procedures," by Klug and Alexander, published by John Wiley and Sons Inc. (1956).

In calculating crystallite size from the measured broadening of the X-ray diffraction lines, one line from a given material can give a calculated crystallite size which differs from that calculated from another line. Since it is the minimum dimension of the unit that is important, the crystallite size should be calculated from the average width of the lines which show the greatest degree of broadening in the particular composition under consideration.

The term "dispersible" as applied to the products in this application, means that according to the procedure outlined below, 90% of the alumina monohydrate contained in the dry product will colloidally disperse.

The procedure is:

(1) Tare a 40-ml. centrifuge tube to ±0.0001 gm.

(2) Add approximately 0.3 gm. of dry alumina monohydrate to the tube and record the weight to ±0.0001 gm.

(3) Add sufficient distilled water to the tube such that the resulting mixture contains one percent $Al_2O_3$ by weight.

(4) Stopper the tube, and shake vigorously for 30 minutes on a "wrist-action" shaker.

(5) Centrifuge for 15 minutes at 1200 r.p.m. such that the mean radius of curvature is 5½ inches.

(6) Decant the supernatant and dry the residue at 150° C. under 20 inches vacuum for 45 minutes. Place tube in desiccator, allow to cool and then weight to ±0.0001 gm.

(7) Caculate the dispersibility according to the formula

Percent non-dispersible alumina =

$$\frac{(\text{wt. percent } Al_2O_3 \text{ in residue})}{(\text{wt. percent } Al_2O_3 \text{ in dry powder})}$$

Percent non-dispersible $=\frac{(\text{wt. of residue})}{(\text{wt. of dry powder})} \times 100$ Dispersibility = 100 − percent non-dispersible This invention is further illustrated by the following examples, in which parts and percentages are by weight unless otherwise noted:

Example 1

As a starting material is used a gibbsite alumina trihydrate. The crystallite size of this alumina is determined by averaging the breadth of X-ray diffraction lines in its pattern at 4.86 A., 4.37 A., 3.30 A., 2.45 A., and 2.38 A. The figure thus obtained corresponds to a crystallite size of 211 mμ. The surface area of the gibbsite is computed from this crystallite size according to the following relationship:

$$A = \frac{K \times D}{d}$$

where:

A is equal to surface area,
D is equal to density,
d is equal to diameter of the crystallite, and
K is a unit conversion constant $$A = \frac{1480}{d}$$

A = 7 square meters/gram.

The apparatus consists of a horizontal, 316 stainless steel, agitated autoclave containing a "ribbon blender" type agitator. Twenty-seven parts of tap water, 10 parts of a gibbsite alumina trihydrate having a surface area of 7 square meters per gram, 1.27 parts of anhydrous ammonium sulfate and 0.96 part of acetic acid are charged to the autoclave and the temperature is adjusted to 30±1° C. The mass is agitated for 10 minutes at 50 r.p.m. Steam from a saturated source (140 p.s.i.g.) is sparged into the autoclave such that a temperature of 155° C. is attained in 9 minutes. The slurry at this point contains 12½% alumina trihydrate calculated as $Al_2O_3$. The mass is held at 155° C. for 8 hours with agitation at 50 r.p.m. It is then cooled to about 30° C., the supernatant liquid is decanted and the remaining slurry is aged for 10 days and then is drum dried on a valley feed, twin roll, drum dryer at 120° C., rotating at 2 r.p.m.

The dry product is alumina monohydrate which is 92.0% dispersible in water and has a specific surface area of 237 square meters per gram as measured by the nitrogen flow method.

Example 2

The apparatus consists of a vertical, electrically heated, 316 stainless steel "Magne Dash" stirrer agitated autoclave. Ninety-seven parts of water, three parts of a gibbsite alumina trihydrate having a surface area of 20 square meters per gram, and 0.77 part of acetic acid are mixed with 0.254 part of anhydrous sodium sulfate. This mixture, which contains about 2% alumina trihydrate calculated as $Al_2O_3$, is placed in the autoclave and agitated for 10 minutes. The temperature is brought to 235° C. in 20 minutes and then the reactor is cooled immediately to below 90° C. by spraying water on the outer surface of the autoclave. The reaction mass is dried at room temperature on a glass plate. The dispersibility of the dry alumina monohydrate product in water is 95% and its specific surface area, as measured by the nitrogen flow method, is 253 square meters per gram.

Example 3

The apparatus is the same as Example 2. The charge of a gibbsite alumina trihydrate having a surface area of 40 square meters per gram is such that the $Al_2O_3$ content is 7.0 weight percent in a water slurry. The alumina trihydrate to acetic acid ratio is 5:1. The following salts are added in separate runs at a concentration of 2 mole per 100 moles of alumina trihydrate present:

Sodium bioxalate
Ammonium sulfate
Diammonium phosphate
Sodium citrate
Ammonium fumarate The autoclave is heated to 180° C. in 15 minutes and that temperature is maintained for one hour. The slurry is cooled in the reactor as in Example 2 and then dried on a glass plate. The dispersibility and surface area of the dried alumina monohydrate products are comparable to the product of Example 2.

Example 4

The equipment consists of two slurry tanks; two centrifugal pumps; a positive displacement pump; a steam injection point at the discharge of the positive displacement pump; a length of stainless steel pipe; a primary, single-tube, water-cooled, circulating cooler with pump; a secondary single-tube, water-cooled cooler; and two pressure control valves.

A 14½% by weight alumina trihydrate aqueous slurry, containing .222 part of ammonium sulfate, 69.5 parts of water, 22 parts of a gibbsite alumina trihydrate having a surface area of 7 square meters per gram, and 8½ parts of acetic acid, is mixed in the two slurry tanks.

Pipeline conditions are adjusted to a pressure of 350 p.s.i.g. at a temperature of 220° C. while pumping water into the pipeline. When conditions reach equilibrium, feed to the pump is changed from water to slurry. Direct steam injection heats the slurry from room temperature to 220° C. in 1½ seconds. The residence time at 220° C. is 10 seconds.

The pressure of the reaction mass is partially reduced as it is cooled to approximately 80° C. by injection into the primary cooler and is then further cooled to about 40° C. in the secondary cooler.

The hydrolyzed slurry is dried in a spray dryer with inlet air temperature of 350% C. and exit temperature of 115° C.

The dry alumina monohydrate powder, screened through a 40-mesh screen, is 97% dispersible in water. Its specific surface area, as measured by the nitrogen flow method, is 320 m.²/gm.

Example 5

The apparatus is the same as Example 4. 17.8 parts of a gibbsite alumina trihydrate having a surface area of 20 square meters per gram, 2.28 parts of acetic acid, 0.18 part of anhydrous ammonium sulfate, 79 parts of water, and .059 part of nitric acid are mixed. This slurry contains 11.6% alumina trihydrate calculated as $Al_2O_3$. The mixture is fed to the pipeline reactor after conditions are adjusted. Direct injection of a little less than ½ pound of steam per pound of slurry heats the slurry to 205° C. in less than 5 seconds. The steam dilution results in a slurry concentration of about 8% alumina trihydrate calculated as $Al_2O_3$. The reaction mass residence time is 4 minutes and cooling is carried out as in Example 4. The slurry is then dried as in Example 4. The dry alumina monohydrate product is 95% dispersible in water. Its specific surface area is 280 m.²/gm. as measured by the nitrogen flow method.

I claim:

1. A process for converting low surface area gibbsite alumina trihydrate into water-dispersible high surface area alumina monohydrate comprising:
   (1) preparing an aqueous mixture of from 1 to 15 weight percent alumina trihydrate calculated as $Al_2O_3$, said alumina having a surface area of about 5 to 50 square meters per gram, said mixture also containing an amount of acetic acid such that the alumina to acetice acid mol ratio is from 1:1 to 10:1, and said mixture also containing a water soluble salt composed of a univalent cation selected from the group consisting of the metals of Group 1-A of the Periodic Table of Elements, amines, ammonium, ethyl ammonium, trimethyl ammonium and tetramethyl ammonium, and an acid anion selected from the group consisting of sulfuric, oxalic, citric, fumaric and phosphoric, said water soluble salt being present in concentrations of from $0.2/v$ to $30/v$ moles per 100 moles of alumina, where $v$ is the valence of the anion;
   (2) heating said aqueous mixture at autogenous pressure for from 10 seconds to 10 hours at a temperature of from 150° C. to 250° C.;
   (3) then cooling, drying and recovering alumina monohydrate characterized as having a surface area of more than 200 square meters per gram and being at least 90 percent by weight dispersible in water.

2. The process of claim 1 in which from 100 to 2000 p.p.m. of a monobasic mineral acid, based on the total weight of the aqueous mixture, replaces from 9 to 12 times its weight of acetic acid.

3. A process for converting low surface area gibbsite alumina trihydrate into water-dispersible high surface area alumina monohydrate comprising:
   (1) preparing an aqueous mixture of from 1 to 15 weight percent of alumina trihydrate calculated as $Al_2O_3$, said alumina having a surface area of about 5 to 50 square meters per gram, said mixture also containing an amount of acetic acid such that the alumina to acetic acid mol ratio is from 1:1 to 6:1, and said mixture also containing a water soluble salt composed of a univalent cation selected from the group consisting of the alkali metals, lower alkylamines and ammonium, and an acid anion selected from the group consisting of sulfuric, oxalic, citric, fumaric and phosphoric, said water soluble salt being present in concentrations of from $0.2/v$ to $30/v$ moles per 100 moles of alumina, where $v$ is the valence of the anion;
   (2) heating said aqueous mixture at autogenous pressure for from 10 seconds to 4 hours at a temperature of from 180° C. to 240° C.;
   (3) then cooling, drying and recovering alumina monohydrate characterized as having a surface area of more than 200 square meters per gram and being at least 90 percent by weight dispersible in water.

4. The process of claim 3 in which from 100 to 2000 p.p.m. of a monobasic mineral acid, based on the total weight of the aqueous mixture, replaces from 9 to 12 times its weight of acetic acid.

References Cited
UNITED STATES PATENTS

| | | | |
|---|---|---|---|
| 2,595,416 | 5/1952 | Schmerling | 260—448 X |
| 2,659,660 | 11/1953 | Sable | 23—143 |
| 2,774,744 | 12/1956 | Barrett et al. | 23—143 X |
| 2,915,475 | 12/1959 | Bugosh | 23—141 X |
| 2,992,262 | 7/1961 | Sears et al. | 260—448 |
| 3,207,578 | 9/1965 | Brown et al. | 23—143 |

OSCAR R. VERTIZ, *Primary Examiner.*

G. T. OZAKI, *Assistant Examiner.*